(12) United States Patent
Ghosh et al.

(10) Patent No.: US 12,346,895 B2
(45) Date of Patent: Jul. 1, 2025

(54) DELEGATED CERTIFICATE AUTHORITY SYSTEM AND METHOD

(71) Applicant: Visa International Service Association, San Francisco, CA (US)

(72) Inventors: Pamela Ghosh, San Mateo, CA (US); Wanyun Gu, Menlo Park, CA (US); Mahdi Zamani, Mercer Island, WA (US); Mihai Christodorescu, Belmont, CA (US); Cuy Sheffield, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/700,131

(22) PCT Filed: Sep. 28, 2022

(86) PCT No.: PCT/US2022/045040
§ 371 (c)(1),
(2) Date: Apr. 10, 2024

(87) PCT Pub. No.: WO2023/064104
PCT Pub. Date: Apr. 20, 2023

(65) Prior Publication Data
US 2024/0330911 A1    Oct. 3, 2024

Related U.S. Application Data

(60) Provisional application No. 63/255,922, filed on Oct. 14, 2021.

(51) Int. Cl.
*G06Q 20/38* (2012.01)
*G06Q 20/36* (2012.01)

(52) U.S. Cl.
CPC ....... *G06Q 20/38215* (2013.01); *G06Q 20/36* (2013.01); *G06Q 20/389* (2013.01)

(58) Field of Classification Search
None
See application file for complete search history.

(56) References Cited

U.S. PATENT DOCUMENTS

| 2013/0019093 A1 | 1/2013 | Seidl et al. |
| 2013/0191227 A1 | 7/2013 | Pasa et al. |

(Continued)

FOREIGN PATENT DOCUMENTS

| CN | 112332980 B | * | 4/2023 | ......... H04L 63/0414 |
| KR | 20170123290 A | | 11/2017 | |
| WO | 2020247694 A1 | | 12/2020 | |

OTHER PUBLICATIONS

PCT/US2022/045040, "International Search Report and Written Opinion", Jan. 25, 2023, 8 pages.

(Continued)

*Primary Examiner* — Steven S Kim
*Assistant Examiner* — Jason B Fenstermacher
(74) *Attorney, Agent, or Firm* — Kilpatrick Townsend & Stockton LLP

(57) ABSTRACT

A method is disclosed. The method includes determining, by a delegated certificate authority computer, a tier from a plurality of tiers for a digital wallet provider based on a list of qualifying criteria. The method also includes generating a digital certificate based on the tier, where the digital certificate is used by a digital wallet application computer associated with the digital wallet provider to complete interactions using a digital currency maintained by a blockchain network. The method further includes transmitting, by the delegated certificate authority computer to a digital wallet application computer, the digital certificate.

13 Claims, 9 Drawing Sheets

(56) References Cited

U.S. PATENT DOCUMENTS

| | | | |
|---|---|---|---|
| 2014/0297525 A1 | 10/2014 | Levchin et al. | |
| 2016/0063466 A1* | 3/2016 | Sheridan et al. | |
| 2018/0227293 A1* | 8/2018 | Uhr | G06Q 20/40 |
| 2019/0164157 A1* | 5/2019 | Balaraman | G06Q 20/36 |
| 2019/0173872 A1* | 6/2019 | Arora | G06Q 20/3825 |
| 2020/0004846 A1 | 1/2020 | Camenisch et al. | |
| 2020/0151682 A1 | 5/2020 | Hurry et al. | |
| 2021/0256505 A1* | 8/2021 | Peng | H04L 9/0894 |
| 2022/0300953 A1* | 9/2022 | Micali | H04L 63/0823 |

OTHER PUBLICATIONS

"What is SET?", https://teaching.shu.ac.uk/aces/rh1/ebiz/what_is_set.htm; 4 pages.

"Secure Electronic Transactions (SET)", https://condor.depaul.edu/kbogue/Paper%201.htm; 3 pages.

Zamani et al., "Cross-border payments for Central Bank Digital Currencies via Universal Payment Channels*", https://usa.visa.com/content/dam/VCOM/global/ms/documents/veei-cross-border-payments-for-cbdcs.pdf, Visa Economic Empowerment Institute, Oct. 2021, 26 pages.

EP22881558.5 , "Extended European Search Report", Aug. 13, 2024, 13 pages.

* cited by examiner

DELEGATED CERTIFICATE AUTHORITY SYSTEM AND METHOD

CROSS-REFERENCES TO RELATED APPLICATIONS

This application is a National Stage of International Application No. PCT/US2022/045040, filed Sep. 28, 2022, which claims priority to and the benefit of U.S. Provisional Patent Application No. 63/255,922, filed on Oct. 14, 2021, which are herein incorporated by reference in their entirety.

BACKGROUND

CBDC (central bank digital currency) can be a digital liability of a central bank of a government. To implement CBDC, the central bank could maintain a blockchain network that were entities can record transactions conducted using the CBDC.

It is likely that most users will use a CBDC blockchain using a digital wallet application of some type. Some reports have indicated that there are currently over 50 million digital wallets in existence today, and there are hundreds if not thousands of different types of digital wallets. Given that the different types of digital wallets can have different functions, capabilities, and credibility, any central bank would be hesitant to allow access to a CBDC blockchain to all digital wallets that might exist. Improvements are needed to ensure that any interactions with a digital currency blockchain such as a CBDC blockchain are secure and trusted.

Embodiments of the disclosure address this problem and other problems individually and collectively.

SUMMARY

One embodiment of the invention includes a method. The method comprises: determining, by a delegated certificate authority computer, a tier from a plurality of tiers for a digital wallet provider based on a list of qualifying criteria; generating, by the delegated certificate authority computer, a digital certificate based on the tier, wherein the digital certificate is used by a digital wallet application computer associated with the digital wallet provider to complete interactions using a digital currency maintained by a blockchain network; and transmitting, by the delegated certificate authority computer to the digital wallet application computer, the digital certificate.

Another embodiment of the invention includes a delegated certificate authority computer comprising: a processor; and a non-transitory computer readable medium comprising instructions executable by the processor to perform operations including: determining a tier from a plurality of tiers for a digital wallet provider based on a list of qualifying criteria; generating a digital certificate based on the tier, wherein the digital certificate is used by a digital wallet application computer associated with the digital wallet provider to complete interactions using a digital currency maintained by a blockchain network; and transmitting, to the digital wallet application computer, the digital certificate.

Yet another embodiment includes a method comprising: transmitting, by a digital wallet application computer to a delegated certificate authority computer, an onboarding request message, wherein the delegated certificate authority computer evaluates a digital wallet application provider to determine a tier based on a set of qualifying criteria; receiving, by the digital wallet application computer from the delegated certificate authority computer, a digital certificate based on the tier; and transmitting, by the digital wallet application computer, the digital certificate to complete an interaction to a blockchain network managing a blockchain for a digital currency or the delegated certificate authority computer, which is in communication with the blockchain network.

Yet another embodiment of the invention includes a digital wallet application computer comprising a processor; and a computer readable medium, the computer readable medium comprising code, executable by the processor for implementing a method comprising: transmitting, by a digital wallet application computer to a delegated certificate authority computer, an onboarding request message, wherein the delegated certificate authority computer evaluates a digital wallet application provider to determine a tier based on a set of qualifying criteria; receiving, by the digital wallet application computer from the delegated certificate authority computer, a digital certificate based on the tier; and transmitting, by the digital wallet application computer, the digital certificate to complete an interaction to a blockchain network managing a blockchain for a digital currency or the delegated certificate authority computer, which is in communication with the blockchain network.

A better understanding of the nature and advantages of embodiments of the invention may be gained with reference to the following detailed description and accompanying drawings.

DETAILED DESCRIPTION

Figure 1:
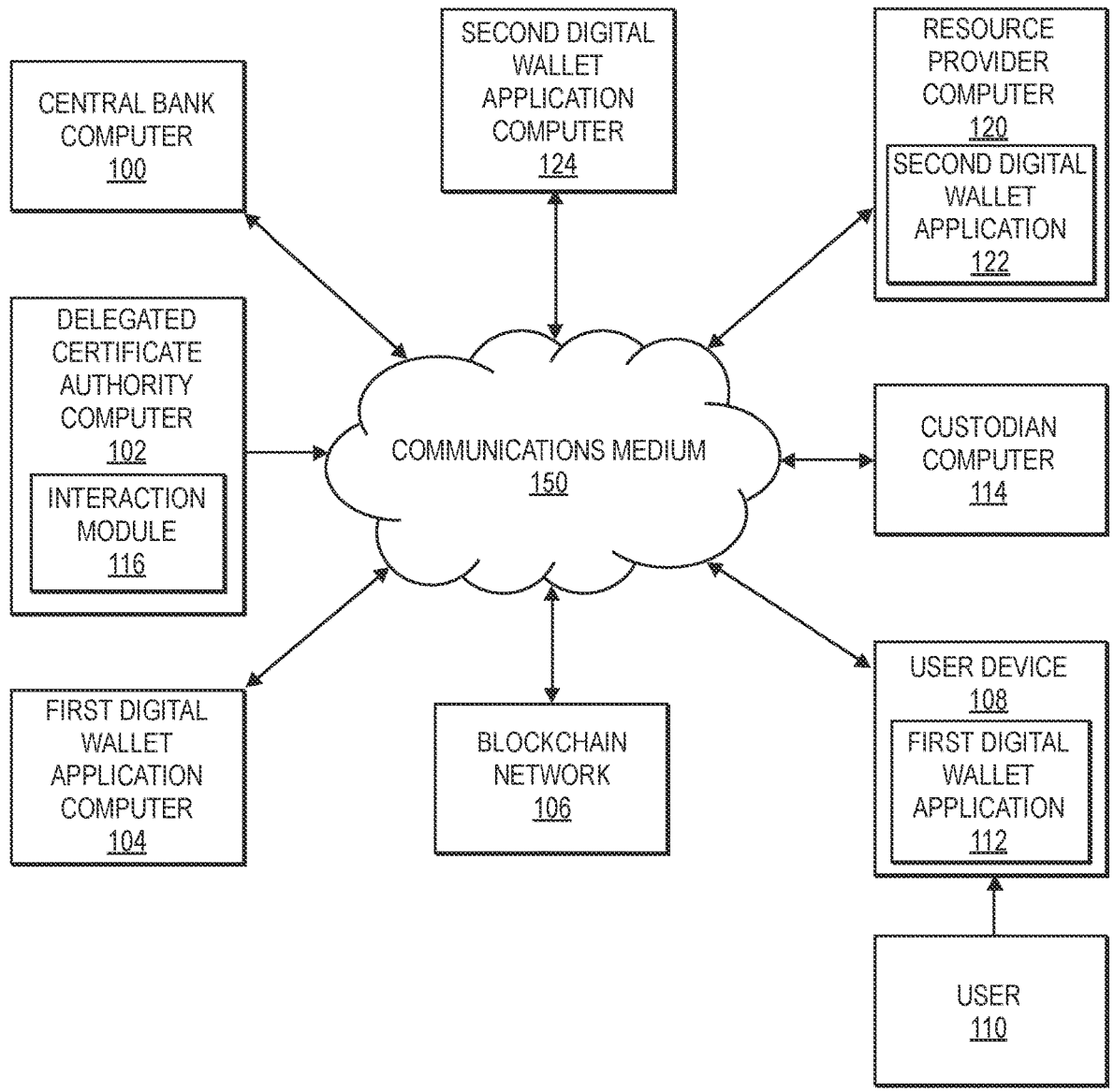
FIG. 1 shows a system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. A user device may also be a credit, debit, or prepaid card.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a payment transaction in which two devices can interact to facilitate a payment.

A "digital signature" may include an electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the sender.

A "blockchain" may include a database that maintains a continuously growing list of records secured from tampering and revision. A blockchain may include a number of blocks of event records recorded by one or more peers. Each block in the blockchain can contain also include a timestamp and a link to a previous block. For example, each block may include a hash of the previous block. Stated differently, event records in a blockchain may be stored as a series of "blocks," or permanent files that include a record of a number of events occurring over a given period of time. Blocks may be appended to a blockchain by an appropriate peer after it completes the block and the block is validated. In embodiments of the invention, a blockchain may be distributed, and a copy of the blockchain may be maintained at each peer in a blockchain network. A blockchain can contain smart contracts which can be executed by the nodes of a blockchain network to implement the functions described herein.

A "node" of a blockchain may include a computer or software node. In some cases, each node in a blockchain network has a copy of a digital ledger or blockchain. Each node checks the validity of each interaction. In some cases, if a majority of nodes say that an interaction is valid then it is written into a block.

FIG. 1 shows a system according to embodiments. The system comprises a central bank computer 100, a delegated certificate authority computer 102 comprising an interaction module 116, a first digital wallet application computer 104, a blockchain network 106, a user device 108 comprising a first digital wallet application 112, a user 110 that operates the user device 108, a custodian computer 114, and a resource provider computer 120 comprising a second digital wallet application 122, and a second digital wallet application computer 124. The first digital wallet application computer 104 can manage the interactions of the first digital wallet application 112. The second digital wallet application computer 124 can manage the interactions of the second digital wallet application 122.

Although a specific number of entities are shown in FIG. 1, embodiments of the invention can include more or less entities than are shown in FIG. 1. For example, the first digital wallet application computer 104 can interact with a large number of users, and not just a single user. Further, the blockchain network 106 can interact with many more digital wallets than are illustrated in FIG. 1.

The central bank computer 100 may issue and manage access to a digital currency such as central bank digital currency (CBDC). CBDC can be a digital form of central bank money. "Central bank money" can refer to money that is a liability of a central bank. In the U.S., there are currently two types of central bank money: physical currency issued by the Federal Reserve and digital balances held by commercial banks at the Federal Reserve. With CBDC, the central bank computer 100 can issue and record ownership of CBDC on the blockchain network 106. The blockchain network 106 can be a network of computers that comprises several blockchain node computers (not shown in FIG. 1).

The central bank computer 100 can allow external computers, such as the first digital wallet application computer 104, to access the blockchain network 106 by issuing a digital certificate to the external computer. The central bank computer 100 can issue the digital certificate, or it may delegate the function of issuing digital certificates to the delegated certificate authority computer 102. The delegated certificate authority computer 102 can issue digital certificates to external computers on behalf of the central bank computer 100.

The first digital wallet application computer 104 can operated by a first digital wallet provider. The first digital wallet application computer 104 may be an application server of the first digital wallet application 112. The first digital wallet application 112 can manage a user account for the user 110. The first digital wallet application 112 can store credentials of the user (e.g., primary account numbers, private keys, public keys, wallet identifiers, etc.). The first digital wallet application 112 can communicate with the resource provider computer 120, the first digital wallet application computer 104, and other computers.

The second digital wallet application computer 124 can operated by a second digital wallet provider. The second digital wallet application computer 124 may be an application server of the second digital wallet application 122. The second digital wallet application 12 manage an account for the resource provider. The account can store credentials (e.g., primary account numbers, private keys, public keys, wallet identifiers etc.). The second digital wallet application 122 can communicate with the user device 108, or other computers In some embodiments, the user 110 can use the first digital wallet application 112 to interact with the resource provider computer 120 to conduct a transaction.

The components in the universal interaction system of FIG. 1 and any of the following figures can be in operative communication with each other through any suitable communications medium 150. Suitable examples of the communications medium 150 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices of FIG. 1 may be transmitted using a secure communications protocol such as, but not limited to, File Transfer Protocol (FTP); HyperText Transfer Protocol (HTTP); and Secure Hypertext Transfer Protocol (HTTPS).

Figure 2:
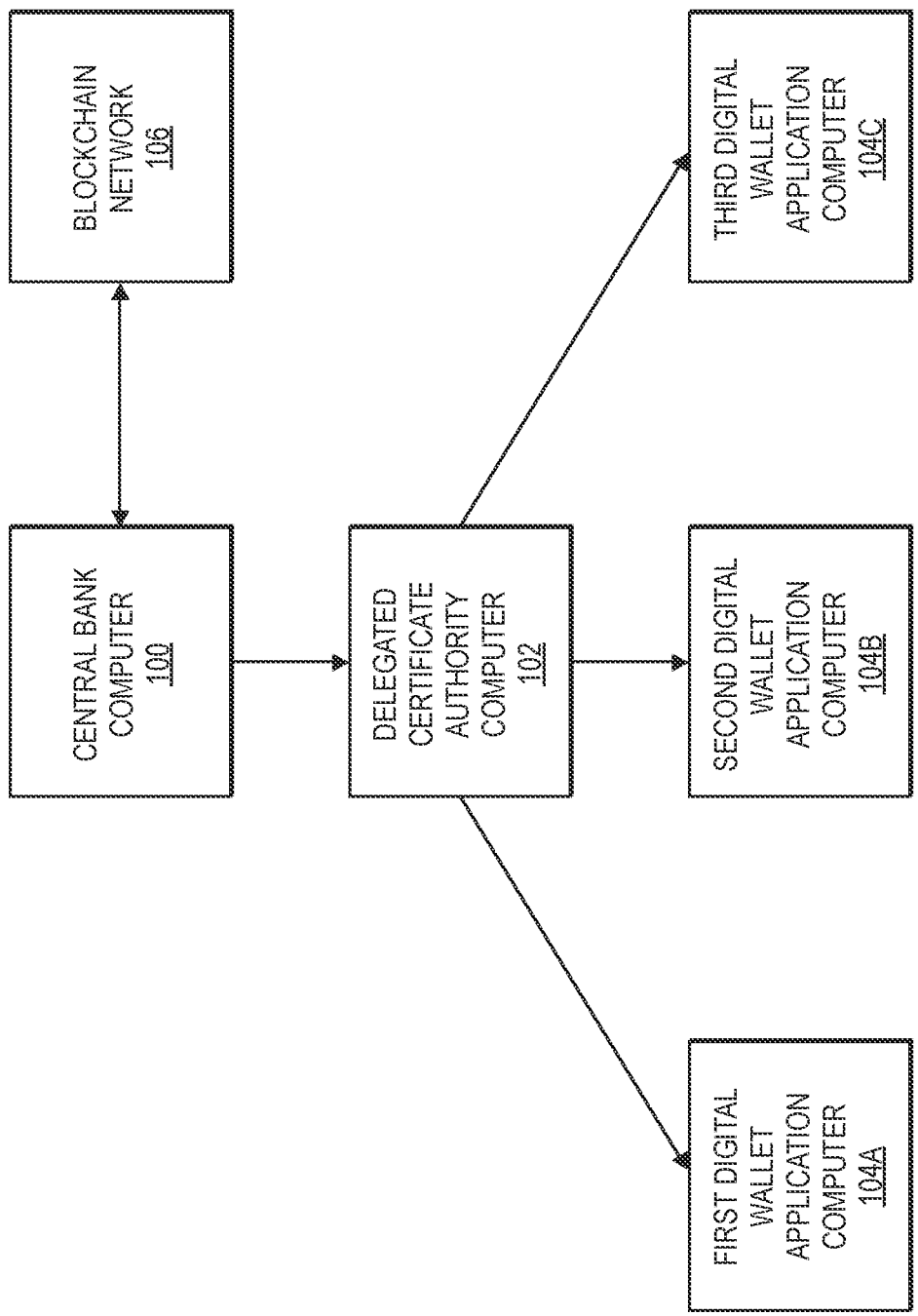
FIG. 2 shows a block diagram of a certificate hierarchy according to embodiments.

FIG. 2 shows a block diagram of a certificate hierarchy according to embodiments. A central bank operating the central bank computer 100 can be a root authority that generates digital certificates for external computers. In the example illustrated by FIG. 2, a first digital wallet application computer 104A, a second digital wallet application computer 104B, and a third digital wallet application computer 104C may act as external computers that request digital certificates to access the blockchain network 106. The digital certificate may be required before any entity is allowed to access CBDC on the blockchain network 106.

In some embodiments, the digital certificate can have suitable information including a public key of the central bank computer 100, the name of the central bank, an expiration date of the digital certificate, a version number, a serial number, and a digital signature of the central bank computer 100. The digital signature can be generated by the central bank computer 100 using a private key of the central bank computer 100 to sign data in the digital certificate. The blockchain network 106 may allow access to the blockchain after verifying information in the digital certificate including verifying the digital signature using a public key of the central bank computer 100.

The central bank computer 100 can choose to provide digital certificates to external computers, or it may delegate the function of providing digital certificates to the delegated certificate authority computer 102. The delegated certificate authority computer 102 can be operated by a trusted entity, such as a payment processing network. The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

When delegating, the central bank computer 100 may define a list of qualifying criteria to the delegated certificate authority computer 102. The list of qualifying criteria can define a plurality of tiers and the criteria required to be assigned to one of the plurality of tiers. Some examples of qualifying criteria can include security based criteria (e.g., the first digital wallet application computer 104A requesting the digital certificate must perform certain encryptions on sensitive data, authenticate users using a one-time password or biometric, etc.), user based criteria (e.g., the user base of the first digital wallet application computer 104A must have at least 100, 1000, 10,000 or more users, must be accessible by users of a specific physical location, etc.), resource based criteria (e.g., whether a digital wallet is sufficiently solvent or has sufficient monetary reserves, etc.) or some other criteria.

The central bank computer 100 can define different levels of access to the blockchain network 106 based on the tier of the digital certificate. For example, a first tier digital certificate can allow the first digital wallet application computer 104A to directly communicate with the blockchain network 106 (e.g., the first digital wallet application computer 104A can initiate transfers of CBDC on the blockchain network 106). A second tier digital certificate can allow the first digital wallet application computer 104A to communicate with the blockchain network 106 via the delegated certificate authority computer 102 (e.g., the first digital wallet application computer 104A can request the delegated certificate authority computer 102 to initiate a transfer of CBDC on the blockchain network 106). In some embodiments, the digital certificate can comprise an expiration date and/or time. After the expiration time is met, the digital certificate may no longer be valid, and the first digital wallet application computer 104A may need to request renewed access to the blockchain network 106. In addition to the expiration date and/or time, the digital certificate can contain a version number, a serial number, an algorithm identifier for the algorithm used to sign the certificate, the name of the entity to whom the digital certificate was issued, a digital signature of the entity that issued the digital certificate, and a public key associated with the digital certificate.

Figure 3:
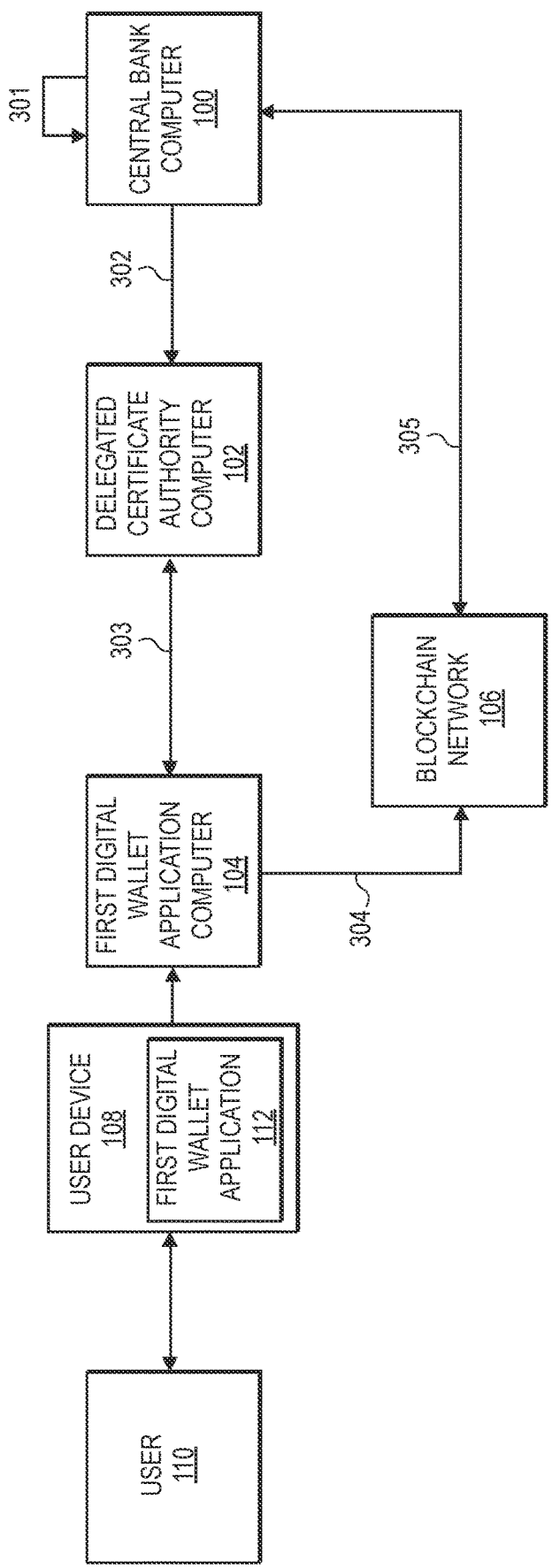
FIG. 3 shows a block diagram and flow of an onboarding process according to embodiments.

FIG. 3 shows a block diagram and flow of an onboarding process according to embodiments.

At step 301, the central bank computer 100 may generate a list of qualifying criteria to receive a digital certificate. The list of qualifying criteria can define a plurality of tiers of digital certificates, and the criteria to be met to receive a digital certificate of the tier. The central bank computer 100 can define different levels of access to the blockchain network 106 based on the tier of the digital certificate. In some embodiments, the central bank computer 100 can determine an expiration time of digital certificates. In such examples, digital certificates would be valid up until the expiration time, after which they would expire and no longer provide access to the blockchain network 106.

At step 302, the central bank, and the central bank computer 100 may delegate the function of being a certificate authority to the delegated certificate authority computer 102. The delegated certificate authority computer 102 and the entity that operates it could be reviewed and audited by the central bank operating the central bank computer 100 before providing an intermediate certificate to the delegated certificate authority computer 102.

After the central bank and the central bank computer 100 have made a determination to delegate certificate issuance authority to the delegated certificate authority computer 102, the central bank computer 100 can transmit the intermediate certificate comprising a first digital signature of the central bank computer 100 to the delegated certificate authority computer 102. The first digital signature can be generated by the central bank computer 100 using a private key of the central bank computer 100. In addition to the digital signature, the intermediate certificate can include an expiration date and/or time, a version number, a serial number, an algorithm identifier for the algorithm used to sign the intermediate certificate, the name of the entity to whom the digital certificate was issued, a digital signature of the central bank computer 100, and a public key associated with the intermediate certificate.

In some embodiments, the central bank computer 100 can transmit an intermediate certificate for each tier of digital certificates included in the list of qualifying criteria. For example, the central bank computer 100 can transmit an intermediate first tier digital certificate, an intermediate second tier digital certificate, and in intermediate third tier digital certificate to the delegated certificate authority computer 102. Each tiered digital certificate may have different qualifying criteria and/or blockchain access permissions.

At step 303, a first digital wallet provider can use the first digital wallet application computer 104 to transmit an onboarding request message to the delegated certificate authority computer 102. The first digital wallet application computer 104 can manage first digital wallet applications that may be present on many user devices. The delegated certificate authority computer 102 can evaluate the first digital wallet provider operating the first digital wallet application computer 104 using the list of qualifying criteria received from the central bank computer 100. For example, the delegated certificate authority computer 102 can programmatically evaluate the security or financial solvency or strength of the first digital wallet provider operating the first digital wallet application 112 or the statistics of the user base of the first digital wallet provider operating the first digital wallet application 112. The evaluation can result in the central bank computer 100 and/or the delegated certificate authority computer 102 assigning a tier to the first digital wallet application provider and its first digital wallet application computer 104 and first digital wallet application 112. In some embodiments, the delegated certificate authority computer 102 may generate a digital certificate based on the tier of the first digital wallet application provider. The digital certificate can include a first digital signature of the central bank computer 100 (e.g., generated using a central bank computer private key) and the delegated certificate authority computer 102 can add a second digital signature of the delegated certificate authority computer 102. The second digital signature can be generated by the delegated certificate authority computer 102 using a private key of the delegated certificate authority computer 102. The digital certificate can also include an expiration date and/or time, a version number, a serial number, an algorithm identifier for the algorithm used to sign the intermediate certificate, the name of the entity to whom the digital certificate was issued, a public key associated with the digital certificate. The delegated certificate authority computer 102 may then transmit the digital certificate to the first digital wallet application computer 104.

In some embodiments, the delegated certificate authority computer 102 can request the blockchain network 106 to generate an account on the blockchain to be associated with the first digital wallet provider. A node in the blockchain network 106 or an application affiliated with the blockchain network 106 can generate a first digital wallet provider identifier (e.g., a randomly generated string that identifies the account on the blockchain) and a first digital wallet provider public/private key pair associated with the first digital wallet provider. In some embodiments, the public key of the first digital wallet provider public/private key pair can be the first digital wallet provider identifier. The first digital wallet provider identifier can identify an account on the blockchain associated with the first digital wallet provider, and the first digital wallet provider private key can be used by the first digital wallet provider to complete interactions on the blockchain. The delegated certificate authority computer 102 may store the first digital wallet provider identifier and the first digital wallet provider private key in memory.

In such embodiments, the delegated certificate authority computer 102 can perform blockchain interactions on behalf of the first digital wallet provider. In such embodiments, the delegated certificate authority computer 102 could check to see that the first digital wallet provider satisfies some criteria before performing blockchain interactions for the first digital wallet provider. For example, delegated certificate authority computer 102 could check a particular financial status of the first digital wallet provider before performing a blockchain interaction for the first digital wallet provider. In another example, the delegated certificate authority computer 102 could check to see that the blockchain interaction is one that is permitted for the first digital wallet provider (e.g., under a predetermined transaction value limit or interaction velocity for the first digital wallet provider). In some embodiments, if the tier assigned to the first digital wallet provider allows the first digital wallet application computer 104 to interact directly with the blockchain network 106, the delegated certificate authority computer 102 can transmit the first digital wallet provider identifier and the digital wallet provider private key to the first digital wallet application computer 104. The first digital wallet application computer 104 can then store the first digital wallet provider private key.

At step 304, after receiving the digital certificate from the delegated certificate authority computer 102, the first digital wallet application computer 104 may transmit a request to add an amount of CBDC to the account associated with the first digital wallet application provider on the blockchain to the blockchain network 106. The request can comprise an amount of CBDC, the digital certificate, and the first digital wallet provider identifier. In some embodiments, if the first digital wallet application computer 104 holds a digital certificate that allows them to directly interact with the blockchain network 106, the first digital wallet application computer 104 may transmit the request directly to the blockchain network 106. In other embodiments, if the first digital wallet application computer 104 holds a digital certificate that allows them to interact with the blockchain network 106 via the delegated certificate authority computer 102, the first digital wallet application computer 104 may transmit the request to the blockchain network 106 via the delegated certificate authority computer 102.

At step 305, after receiving the request from the first digital wallet application computer 104, the blockchain network 106 may verify the first digital signature and the second digital signature of the digital certificate. The blockchain network 106 (or one or more nodes in the blockchain network 106) can retrieve a public key of the central bank computer 100 to verify the first digital signature, and a public key of the delegated certificate authority computer 102 to verify the second digital signature. After the blockchain network 106 verifies the signatures on the digital certificate, the blockchain network 106 can complete the interaction by adding the amount of CBDC to the account associated with the first digital wallet application provider on the blockchain maintained by the blockchain network 106. The CBDC can be added to the blockchain using techniques known in the art (e.g., such as those used by cryptocurrencies such as Bitcoin and Ethereum). The nodes in the blockchain network 106 can be programmed to perform the above functions, or they may be implemented by smart contracts on the blockchain maintained by the blockchain network 106.

Figure 4:
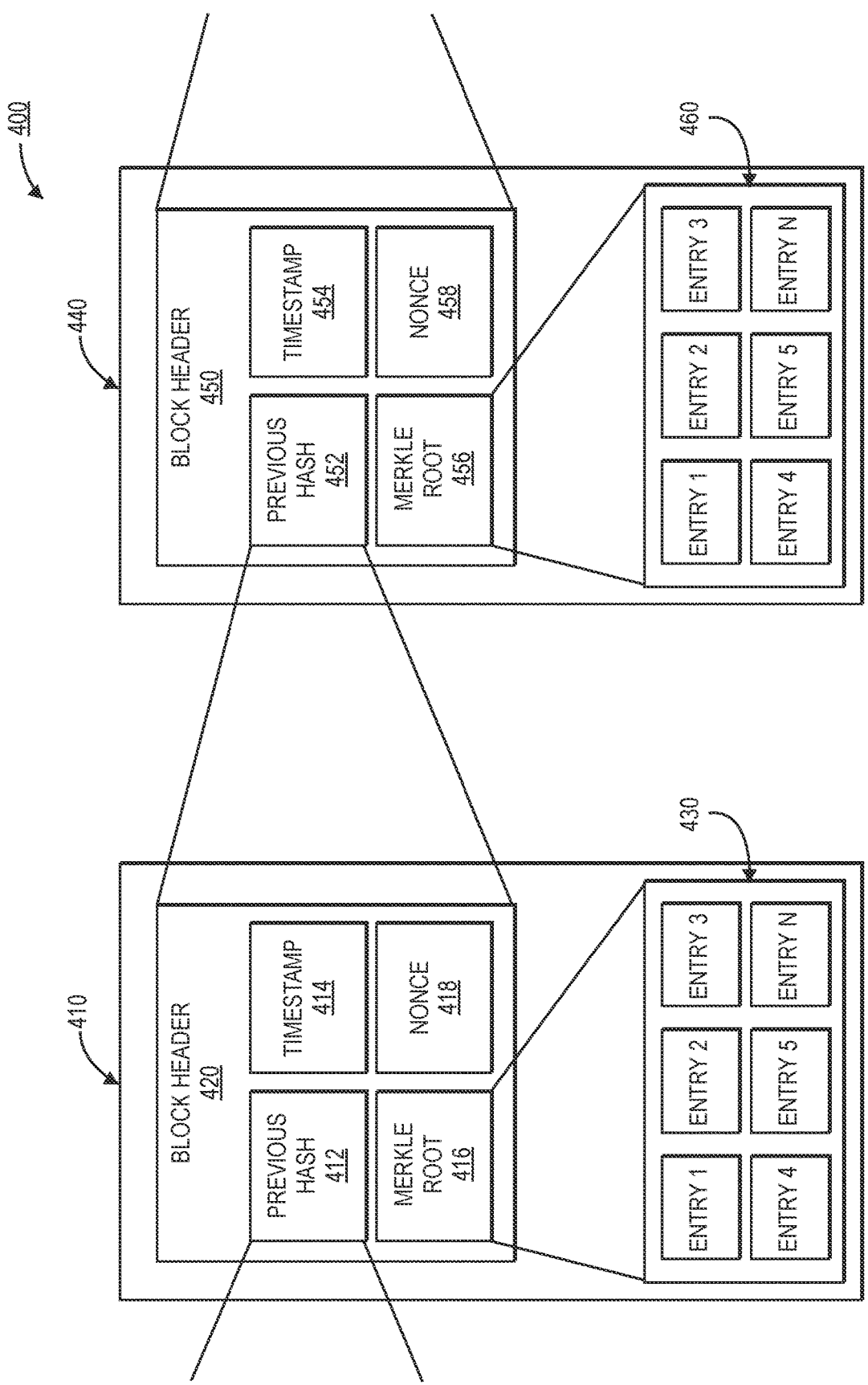
FIG. 4 show a block diagram of a blockchain according to embodiments.

FIG. 4 show an example block diagram of a blockchain 400 according to embodiments. The blockchain 400 can be maintained by the blockchain network 106, which can comprise a plurality of blockchain node computers. Each of the blockchain node computers can maintain a copy of the blockchain 400. The blockchain 400 comprises a first block 410 and a second block 440. The blockchain 400 can include any suitable number of blocks, such as 10, 50, 100, 2000, etc.

The blockchain 400 can create a history of interactions in a series of blocks, where each blocks contains a hash of the previous block. This creates a chain of blocks, where any changes made to a block will change that block's hash, which must be recomputed and stored in the next block. This changes the hash of the next block, which must also be recomputed and so on until the end of the chain.

Although the hash can be simple to compute, rules may be imposed, which require the value of the hash to be below a certain threshold value (i.e., a difficulty value). In addition, the hash is based on a type of mathematical function that is not reversible. One cannot predict what input can be used to produce the desired output. A valid hash is found by repeatedly adjusting a changeable value in the block, and recalculating the hash until it meets the validity requirements. The freely changeable value can be a nonce. The unpredictable nature of the hash increases the difficulty of finding a nonce that produces a valid hash of the block.

As an example, the first block 410 can include a block header 420 and block entries 430. The block header 420 of the first block 410 can comprise a previous hash 412, a timestamp 414, a Merkle root 416, and a nonce 418.

The previous hash 412 can be a hash of the previous block's header. The previous hash 412 can be the result of a non-reversible mathematical computation using data from the previous block as the input. According to some embodiments, the computation used can include a SHA256 hash function. One of ordinary skill in the art would recognize that any suitable hash function could be used without departing from the spirit and scope of the present invention. The hash function can be designed so that any change to the data in the previous block results in an unpredictable change in the hash of that block. The previous hash 412 can be a link between blocks, chaining them together to form the blockchain 400.

When calculating the previous hash 412 for the previous block, a node can determine if the previous hash 412 can meet certain criteria defined by a difficulty value. In some embodiments, the difficulty value may include a number that the calculated hash must be less than. However, because the output of the hashing function is unpredictable, the output cannot be determined what input will result in an output that is less than the difficulty value before the hash is calculated. The nonce 418 can be used to vary the data content of the block, allowing for a large number of different outputs to be produced by the hash function in pursuit of an output that meets the difficulty value. This makes can make it computationally expensive to produce a valid block with a nonce 418 that produces a hash value meeting the criteria of the difficulty value.

The hash algorithms used for the previous hash 412 can include MD5, SHA-1, SHA-224, SHA-256, SHA-384, SHA-512, SHA-512/224, SHA-512/256, SHA-3 or any suitable hash function. There is also no requirement that a hash be computed only once. The results of a hash function may be reused as inputs into another or the same hash function again multiple times in order to produce a final result. One of ordinary skill in the art would recognize that any hash function could be used to compute the required hashing without departing from the spirit and scope of the present invention.

The Merkle root 416 can be a root of a Merkle tree, which can include a tree in which every leaf node is labelled with the hash of a data block, for example an entry. Each leaf of the Merkle tree can represent one of the entries. Each entry can be hashed together with a sibling node (i.e., entry) in the Merkle tree. Successively hashing sibling nodes in the Merkle tree can result in the Merkle root 416.

The block entries 430 can include data of interactions (e.g., amounts of CBDCs transferred, account balances, wallet identifiers, etc.). The block entries 230 can include any suitable number of entries. In other embodiments, the number of entries in the block entries 430 may be a predetermined number of entries. The entries may include data pertaining to digital currency (e.g., CBDC) transactions on the blockchain.

The timestamp 414 can include a time that the block was created. According to some embodiments of the present invention, the full nodes of the verification network can check the timestamp 414 against their own known time and can reject any block that has an erroneous timestamp.

The nonce 418 can be a value adjusted by a full node while performing a proof-of-work process, as described herein. A nonce can be input into a hash function along with block data to determine the output hash value. A correct nonce (also referred to as a golden nonce) yields an output hash value that satisfies a predetermined criterion, such as being less than a difficulty value.

The second block 440 can have similar data elements as the first block 410. For example, the second block 440 can include a block header 450 and block entries 460. The block header 450 of the second block 440 can comprise a previous hash 452, a timestamp 454, a Merkle root 456, and a nonce 458. The block entries 460 can include interaction data as well as smart contracts, and can be similar to the block entries 430.

Figure 5:
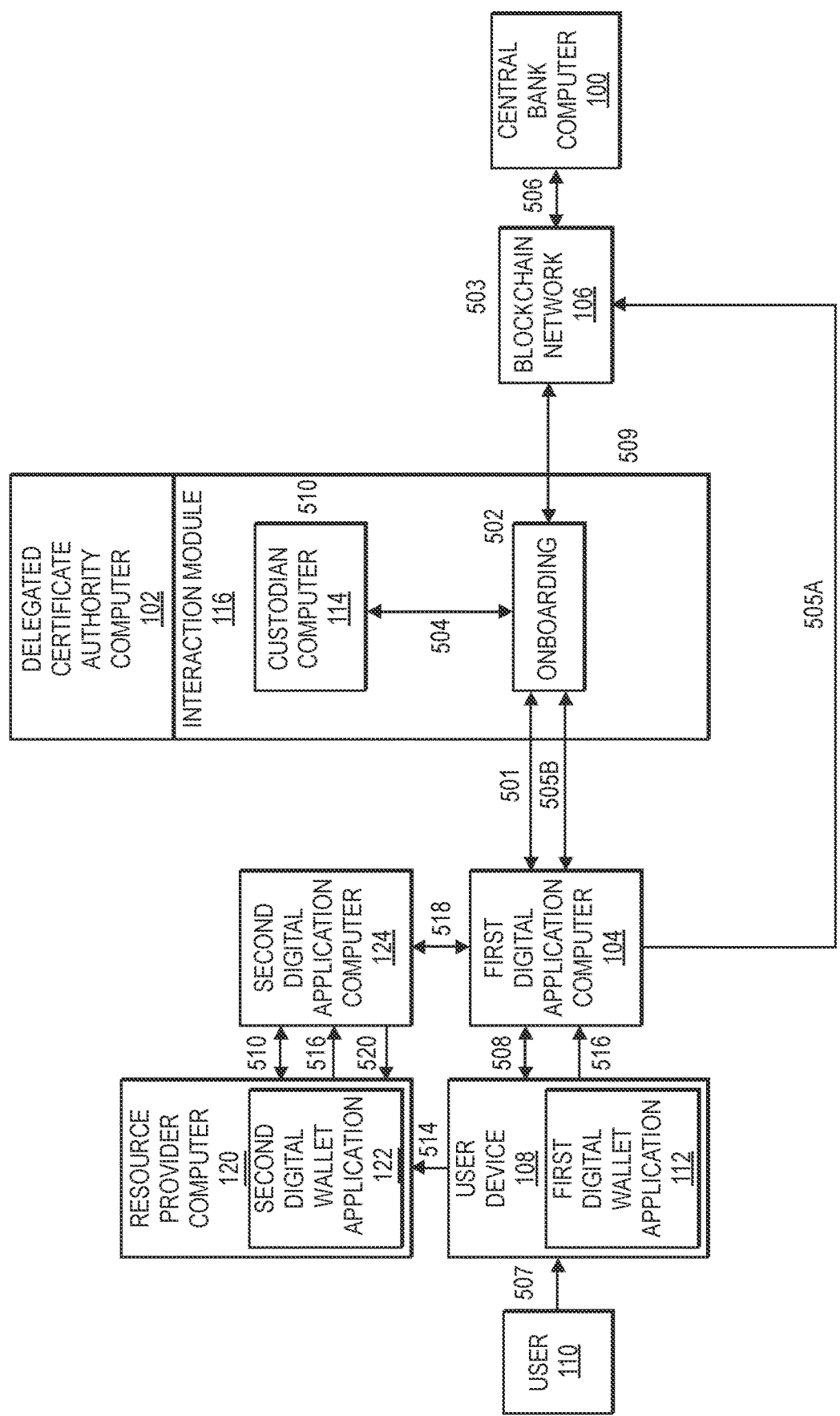
FIG. 5 shows a flow diagram according to embodiments.

FIG. 5 shows a system with an overlaid process flows according to embodiments. Many of the entities shown in FIG. 5 are also present in FIG. 1.

The central bank computer 100 may have delegated authority for providing digital certificates to requesting entities and regulating access for some requesting entities the blockchain network 106 to the delegated certificate authority computer 102. As a part of the process of delegating authority to the delegated certificate authority computer 102, the central bank computer 100 may have transmitted an intermediate certificate to the delegated certificate authority computer 102. The intermediate certificate can comprise at least a first digital signature and a list of qualifying criteria. The qualifying criteria can be criteria that users or financial institutions need to satisfy to receive one of a plurality of tiered digital certificates. The tiered digital certificates may provide different levels of access to the blockchain network 106 or different types of privileges with respect to the blockchain network 106 or the blockchain that it manages.

As illustrated in FIG. 5, the delegated certificate authority computer 102 can comprise the interaction module 116 which can be programmed to perform several functions. Such functions can include facilitating the onboarding of a digital wallet provider to the blockchain network 106, and the transfer of CBDC between accounts on the blockchain network 106.

Steps 501-506 illustrate steps that are part of the onboarding of the digital wallet provider to the system including the blockchain network. Additional detail regarding these steps is provided above.

At step 501, the first digital wallet application computer 104 can transmit an onboarding request message to the interaction module 116 of the delegated certificate authority computer 102. The onboarding request message may include onboarding information such as the name of the wallet provider operating the first digital wallet application computer 104 and any details that may satisfy certain qualifying criteria for the access desired by the wallet provider.

At step 502, after receiving the onboarding request message, the delegated certificate authority computer 102 can evaluate the digital wallet provider based on a list of qualifying criteria received from the central bank computer 100. For example, the delegated certificate authority computer 102 or the entity operating the delegated certificate authority computer 102 can evaluate the information in the onboarding request message or may evaluate the digital wallet provider or the first digital wallet application computer 104. The onboarding request message could include information including, but not limited, to a digital wallet provider identifier associated with digital wallet provider, information needed by the delegated certificate authority computer 102 to evaluate the tier to be assigned to the digital wallet identifier, etc. The delegated certificate authority computer 102 may then generate a digital certificate based on the tier that is appropriate for the digital wallet provider operating the first digital wallet application computer 104. In some embodiments, the digital certificate can comprise the first digital signature of the central bank computer 100 and a second digital signature of the delegated certificate authority computer 102.

After generating the digital certificate, the delegated certificate authority computer 102 may transmit a request to the blockchain network 106 to generate an account for the digital wallet provider. The request may be received by one or more nodes of the blockchain network 106.

At step 503, after receiving the request to generate an account for the digital wallet provider from the delegated certificate authority computer 102, the blockchain network 106 can generate a digital wallet provider identifier and a digital wallet provider public/private key pair for the digital wallet provider in the blockchain. The digital wallet provider identifier can identify an account of the digital wallet provider on the blockchain, and the digital wallet private key can be used to complete interactions on the blockchain. In some embodiments, the digital wallet provider identifier can be the public key corresponding to the digital wallet provider private key.

At step 504, after generating the digital wallet provider identifier and the digital wallet provider private key for the digital wallet provider, the blockchain network 106 may transmit the digital wallet provider identifier and the digital wallet provider private key to the interaction module 116. In some embodiments, the delegated certificate authority computer 102 may then store the digital wallet provider identifier and the digital wallet provider private key. The delegated certificate authority computer 102 may store the digital wallet provider identifier and the digital wallet provider private key in a secure memory, or with a custodian computer 114. The custodian computer 114 can be internal or external to the delegated certificate authority computer 102. In some embodiments, the delegated certificate authority computer 102 can transmit the digital certificate to the first digital wallet application computer 104.

In some embodiments, the delegated certificate authority computer 102 may then transmit the digital certificate, the digital wallet provider identifier, and the digital wallet provider private key to the first digital wallet application computer 104.

At step 505A, after receiving the digital certificate from the delegated certificate authority computer 102, the first digital wallet application computer 104 can transmit a request to add an amount of CBDC to the digital wallet provider account on the blockchain managed by the blockchain network 106. The request can comprise an amount of CBDC, the digital wallet provider identifier, and the digital certificate. In some embodiments, if the digital certificate is of a tier that allows the digital wallet provider to interact directly with the blockchain network 106, the first digital wallet application computer 104 may transmit the request directly to the blockchain network 106. In other embodiments, as in step 505B, the first digital wallet application computer 104 can transmit the request via the interaction module 116 of the delegated certificate authority computer 102. In such examples, the interaction module 116 of the delegated certificate authority computer 102 can receive the request comprising the amount of CBDC and the digital certificate. The interaction module 116 may then retrieve the digital wallet provider identifier from the custodian computer 114, then transmit the request to the blockchain network 106 on behalf of the first digital wallet application computer 104. The delegated certificate authority computer 102 can check any appropriate criteria (e.g., the first digital wallet application computer's financial strength, its security protocols, etc.) before transmitting the request to the blockchain network 106. In other embodiments, the central bank computer 100 or the delegated certificate authority computer 102 can transmit the request to add the amount of CBDC to the digital wallet provider account on the blockchain managed by the blockchain network 106.

At step 506, after receiving the request to add CBDC to the digital wallet provider account, the blockchain network 106 may retrieve the public key of the central bank computer 100 and the delegated certificate authority computer 102. The blockchain network 106 may then verify the first digital signature of the digital certificate using the public key of the central bank computer 100 and then verify the second digital signature of the digital certificate using the public key of the delegated certificate authority computer 102. After verifying the digital certificate, the blockchain network 106 may then communicate with the central bank computer 100 to issue and record the requested amount of CBDC to the digital wallet provider account identified by the digital wallet provider identifier on the blockchain on the blockchain network 106 (e.g., in exchange for conventional fiat currency). The blockchain network 106 can then notify the first digital wallet application computer 104 that the amount of CBDC was added to the digital wallet provider account maintained by the blockchain on the blockchain network 106.

Steps 507-510 illustrate the onboarding of user with a first digital wallet provider operating the first digital wallet application computer 104, and a resource provider operating a resource provider computer 120 onboarding with a second digital wallet application computer 124.

At step 507, the user 110 can input a request to generate a user account and request the addition of a predetermined amount of CBDC to a first digital wallet application account associated with the first digital wallet application 112 installed on the user device 108.

At step 508, after receiving the request to generate the user account from the first digital wallet application 112, the first digital wallet application computer 104 can generate a user account and can provide a first user account identifier to the user 110. In some embodiments, the first digital wallet application account can be a custodial account maintained by the first digital wallet application computer 104. As such, the first digital wallet application 112 and the user device 108 may not interact directly with the blockchain network 106 or the delegated certificate authority computer 102. Rather, the first digital wallet application computer 104 can interact with the blockchain network 106 and/or the delegated certificate authority computer 102 on behalf of the user 110 and other users that are enrolled with the first digital wallet provider associated with the first digital wallet application computer 104.

In step 510, the resource provider computer 120 can load a second digital wallet application 122 and can also enroll with the second digital wallet application computer 124. The second digital wallet application computer 124 can then create a resource provider account with the second digital wallet application computer 124 and can provide resource provider account identifier to the resource provider operating the resource provider computer 120. Like the first digital wallet application computer 104, the second digital wallet application computer 124 can maintain a custodial account for the resource provider operating the resource provider computer 120.

Steps 514-520 illustrate an interaction between the user 110 and the resource provider computer 118. The interaction can be a transaction performed in CBDC for a good or service purchased by the user 110 from the resource provider operating the resource provider computer 118.

At step 514, first digital wallet application 112 of the user device 108 can provide the user account identifier to the second digital wallet application 122 on the resource provider computer 120, after the user of the user device 108 has agreed to obtain a resource (e.g., a good or service) for a predetermined amount of CBDC from the resource provider operating the resource provider computer 120.

At step 516, the second digital wallet application 122 and the resource provider computer 120 can communicate data regarding the transaction (e.g., a user account identifier, a resource provider account identifier, and a transaction amount) to the second digital wallet application computer 124. In some embodiments, the second digital wallet provider operating the second digital wallet application computer 124 could be an acquirer that holds an account of the resource provider operating the resource provider computer 120.

At step 518, the second digital wallet application computer 124 can communicate with the first digital wallet application computer 104 to determine if the user 110 has sufficient CBDC to conduct the transaction. In some embodiments, the first digital wallet provider operating the first digital wallet application computer 104 can be an issuer that holds an account associated with the user 110.

At step 520, the second digital wallet application computer 124 can send a communication back to the second digital wallet application 122 indicating that the transaction is approved, if the user 110 has sufficient CBDC to conduct the transaction. Once approved, the user 110 can obtain the desired resource from the resource provider operating the resource provider computer 118.

At the end of the day or at any other suitable period of time, after the first digital wallet application computer 104 has conducted transactions for its users, and the second digital wallet application computer 124 has conducted transactions for its users, each of these computers 104, 124 can communicate with each other (e.g., via the delegated certificate authority computer 102 to perform a net settlement on the blockchain network 106. For example, it may be determined each of the first digital wallet application computer 104 and the second digital wallet application computer 124 has conducted thousands of transactions for its users with various digital wallet application computers over a period of a day, that the net amount owed by the first digital wallet application computer 104 to the second digital wallet application computer 124 is 1 million CBDC, then the first digital wallet application computer 104 can communicate with the blockchain network 106 (e.g., either directly or via the delegated certificate authority computer 102) to transfer 1 million CBDC from the first digital wallet provider operating the first digital wallet application computer 104 to the second digital wallet provider operating the second digital wallet application computer 124.

Figure 6:
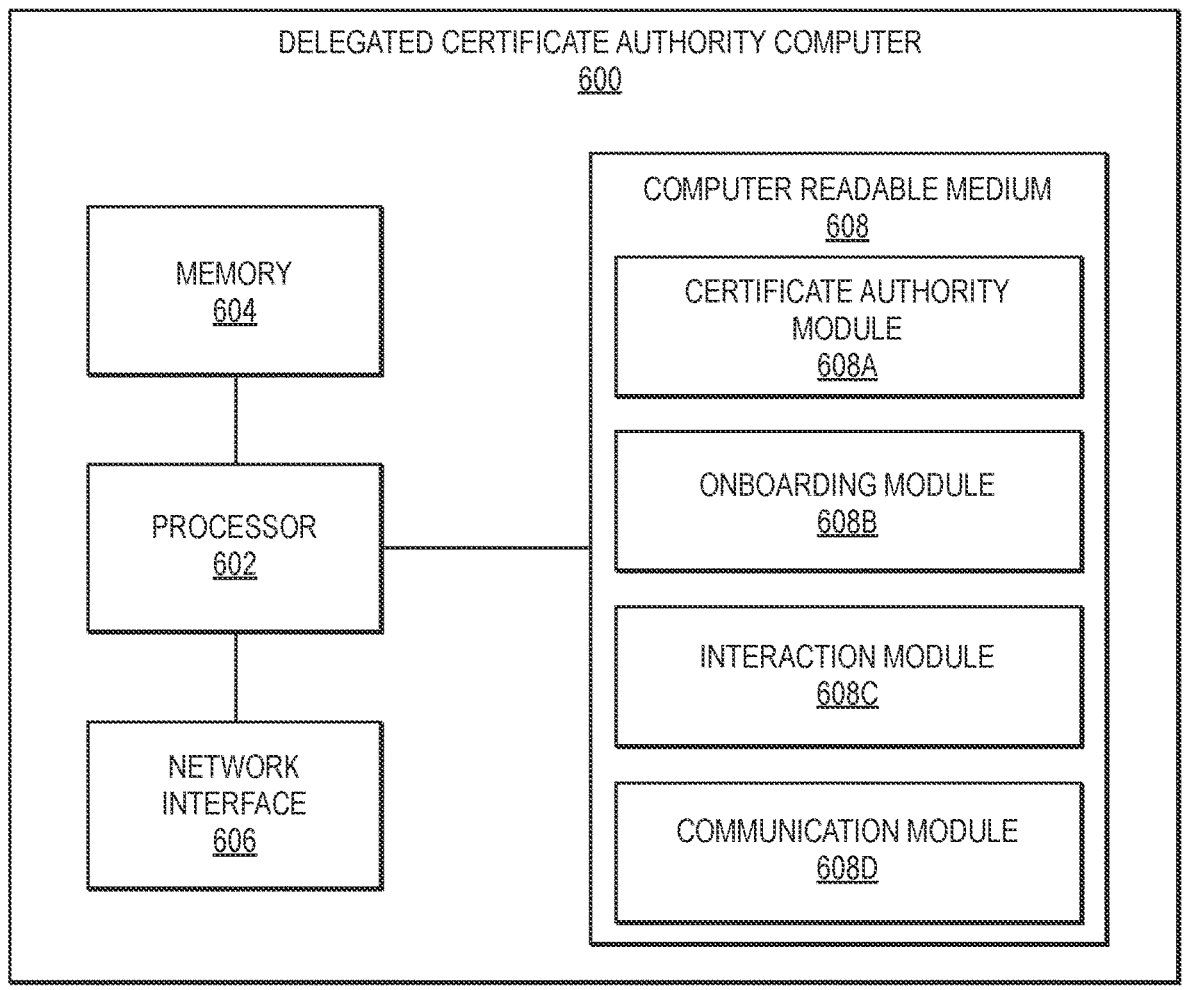
FIG. 6 shows a block diagram of a delegated certificate authority computer according to embodiments.

FIG. 6 shows a block diagram of a delegated certificate authority computer 600 according to embodiments. The delegated certificate authority computer 600 may comprise a processor 602, which may be coupled to a memory 604, a network interface 606, and a computer readable medium 608.

The memory 604 may contain wallet identifiers, device details, digital certificates, etc. The memory 604 may be coupled to the processor 602 internally or externally (e.g., via cloud based data storage), and may comprise any combination of volatile and/or non-volatile memory such as RAM, DRAM, ROM, flash, or any other suitable memory device.

The network interface 606 may include an interface that can allow the delegated certificate authority computer 600 to communicate with external computers and/or devices. The network interface 606 may enable the delegated certificate authority computer 600 to communicate data to and from another device such as a central bank computer, a digital wallet application computer, a blockchain network, an acquirer computer, an authorizing entity computer, etc. Some examples of the network interface 606 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 606 may include Wi-Fi. Data transferred via the network interface 606 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 606 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 608 may comprise code, executable by the processor 602, for a method comprising: determining a tier from a plurality of tiers for a digital wallet provider based on a list of qualifying criteria; generating a digital certificate based on the tier, wherein the digital certificate is used by a digital wallet application computer associated with the digital wallet provider to complete interactions using a digital currency maintained by a blockchain network; and transmitting, to a digital wallet application computer, the digital certificate.

The computer readable medium 608 may comprise a number of software modules including, but not limited to, a certificate authority module 608A, an onboarding module 608B, an interaction module 608C, and a communication module 608D.

The certificate authority module 608A may comprise code that causes the processor 602 to issue digital certificates. For example, the certificate authority module 608A can allow the delegated certificate authority computer 600 to receive intermediate certificates from a central bank computer, and generate a digital certificate using the intermediate certificate. The certificate authority module 608A can allow the delegated certificate authority computer 600 to evaluate digital wallet providers and assign the digital wallet provider a tier based on a list of qualifying criteria received from a central bank computer. The certificate authority module 608A can allow the delegated certificate authority computer 600 to generate digital certificates with different levels of access to a blockchain.

The onboarding module 608B may comprise code that causes the processor 602 to onboard external entities to a blockchain. The onboarding module 608B can be used by the delegated certificate authority computer 600 to onboard a digital wallet provider or a user to a blockchain. The onboarding module 608B can allow the delegated certificate authority computer 600 to generate an account for an entity on a blockchain, and to provide the entity access to the account on the blockchain.

The interaction module 608C may comprise code that causes the processor 602 to process interactions. For example, the interaction module 608C can be used to process interactions received from a digital wallet provider computer.

The communication module 608D may comprise code that causes the processor 602 to generate messages, forward messages, reformat messages, and/or otherwise communicate with other entities.

Figure 7:
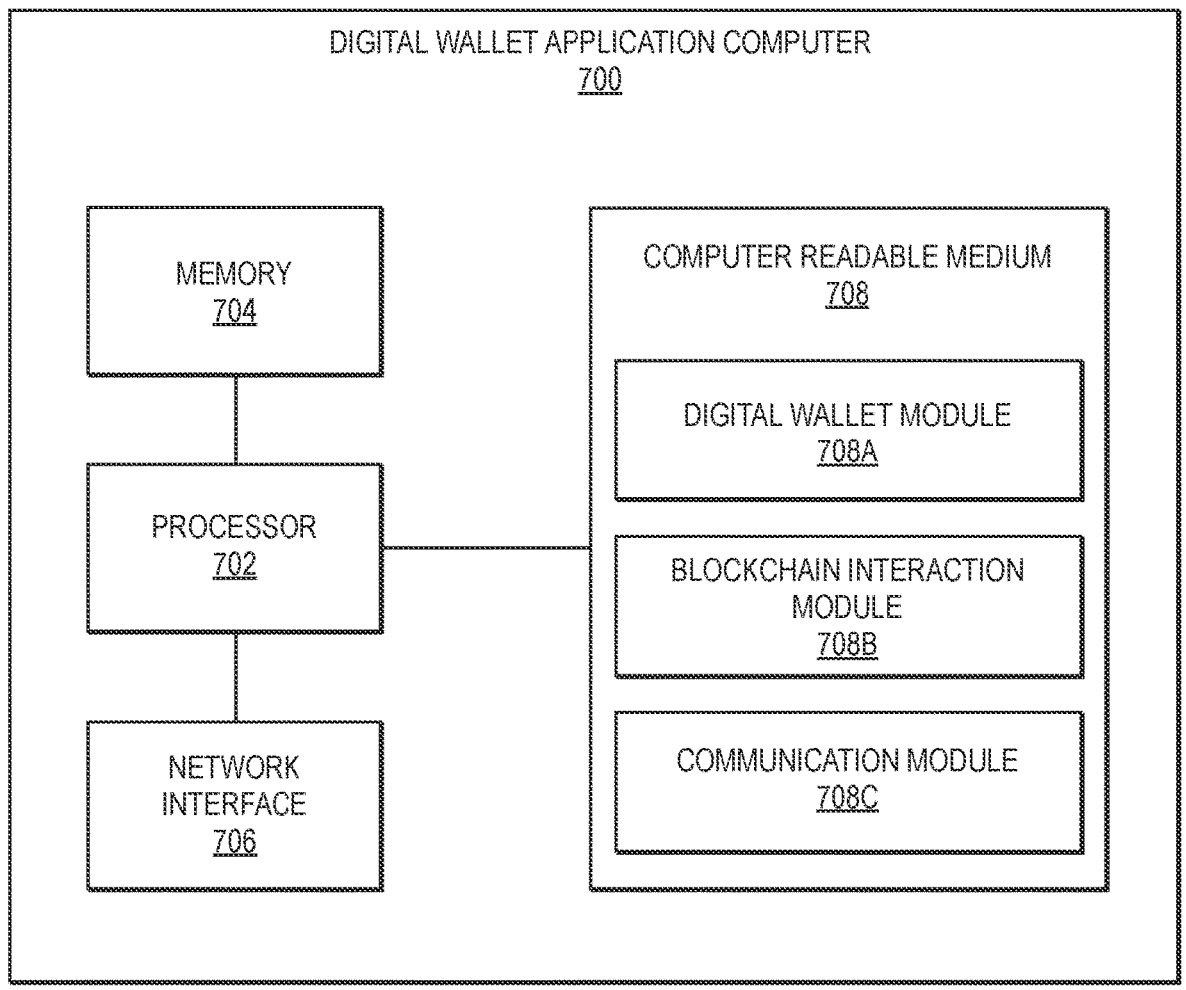
FIG. 7 shows a block diagram of a digital wallet application computer according to embodiments.

FIG. 7 shows a block diagram of a digital wallet application computer 700 according to embodiments. The digital wallet application computer 700 may comprise a processor 702, which may be coupled to a memory 704, a network interface 706, and a computer readable medium 708.

The memory 704 and the network interface 706 may have similar or different features to the previously described memory 604 and network interface 606.

The computer readable medium 708 may comprise code, executable by the processor 702, to implement a method comprising: transmitting, by a digital wallet application computer to a delegated certificate authority computer, an onboarding request message, wherein the delegated certificate authority computer evaluates a digital wallet application provider to determine a tier based on a set of qualifying criteria; receiving, by the digital wallet application computer from the delegated certificate authority computer, a digital certificate based on the tier; and transmitting, by the digital wallet application computer, the digital certificate to complete an interaction to a blockchain network managing a blockchain for a digital currency or the delegated certificate authority computer, which is in communication with the blockchain network.

The computer readable medium 708 may comprise a number of software modules including, but not limited to, a digital wallet module 708A, a blockchain interaction module 708B, and a communication module 708C.

The digital wallet module 708A can allow the digital wallet application computer 700 to maintain a digital wallet application. The digital wallet module 708A can allow the digital wallet application computer 700 to act as an application server for user devices. The digital wallet module 708A can provide software updates to communicate with, and received data from digital wallet applications installed on user devices. For example, the digital wallet module 708A can receive and fulfill requests for user accounts.

The blockchain interaction module 708B can allow the digital wallet application computer 700 to interact with a blockchain. The blockchain interaction module 708B can allow the digital wallet application computer 700 to generate instructions to transfer amounts of CBDC from one account on a blockchain to another account on the blockchain. The blockchain interaction module 708B can allow the digital wallet application computer 700 to interact directly with a blockchain, or with the blockchain via an interaction module of a delegated certificate authority computer. The blockchain interaction module 708B can store a digital certificate used to access a blockchain, and account identifiers.

The communication module 708C may comprise code that causes the processor 702 to generate messages, forward messages, reformat messages, and/or otherwise communicate with other entities.

Figure 8:
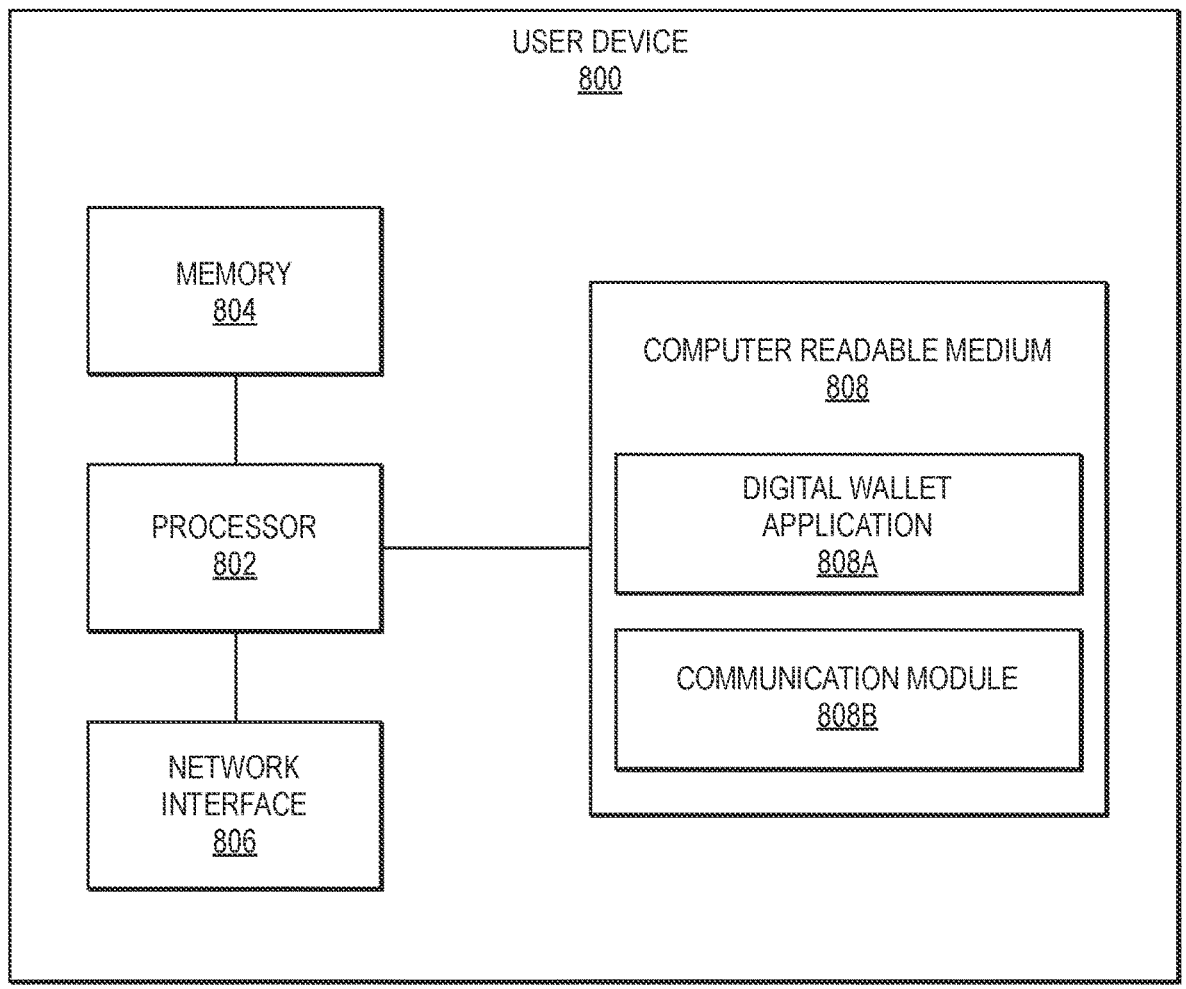
FIG. 8 shows a block diagram of a user device according to embodiments.

FIG. 8 shows a block diagram of a user device 800 according to embodiments. The user device 800 may comprise a processor 802, which may be coupled to a memory 804, a network interface 806, and a computer readable medium 808.

The memory 804 and the network interface 806 may have similar or different features to the previously described memory 604 and network interface 606.

The computer readable medium 808 may comprise a number of software modules including, but not limited to, a digital wallet application 808A and a communication module 808B.

The digital wallet application 808A may comprise code that causes the processor 802 to operate a digital wallet. For example, the digital wallet application 808A can allow the user device 800 to communicate with a digital wallet application.

The communication module 808B may comprise code that causes the processor 802 to generate messages, forward messages, reformat messages, and/or otherwise communicate with other entities.

Figure 9:
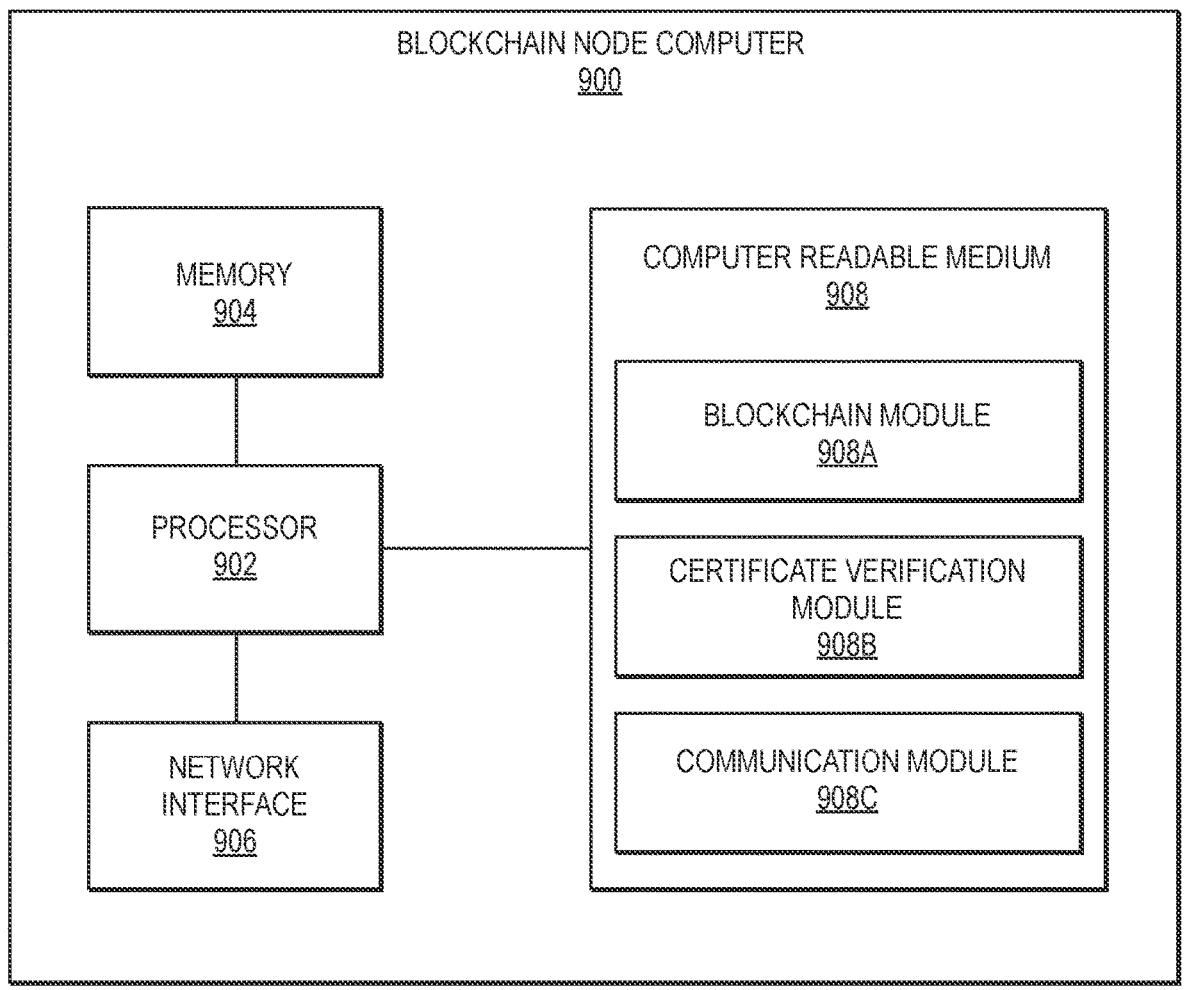
FIG. 9 shows a block diagram of a blockchain node computer according to embodiments.

FIG. 9 shows a block diagram of a blockchain node computer 900 according to embodiments. The blockchain node computer 900 may comprise a processor 902, which may be coupled to a memory 904, a network interface 906, and a computer readable medium 908. The blockchain node computer 900 may be one of a plurality of node computers that form a blockchain network. The plurality of blockchain node computers 900 can operate a blockchain, such as the blockchain shown in FIG. 3.

The memory 904 and the network interface 906 may have similar or different features to the previously described memory 604 and network interface 606.

The computer readable medium 908 may comprise a number of software modules including, but not limited to, a blockchain module 908A, a certificate verification module 908B, and a communication module 908C.

The blockchain module 908A may comprise code that causes the processor 902 to operate a blockchain. The blockchain module 908A can allow the blockchain node computer 900 to generate new blocks in a blockchain. The blockchain module 908A can include hashing algorithms used to generate blocks. The blockchain module 908A can process interactions by updating entries in blocks using interaction data, such as account identifiers, amounts of CBDCs, etc.

The certificate verification module 908B may comprise code that causes the processor 902 to verify certificates. The certificate verification module 908B can allow the blockchain node computer 900 to access public keys used to verify a digital signature. For example, the blockchain node computer 900 can use the certificate verification module 908B to retrieve a public key of a central bank computer and a public key of a delegated certificate authority computer to verify a digital certificate.

The communication module 908C may comprise code that causes the processor 902 to generate messages, forward messages, reformat messages, and/or otherwise communicate with other entities.

Embodiments of the invention have a number of advantages. Embodiments of the invention can ensure that any entity that interacts with a secure digital currency blockchain such as a CBDC blockchain will be trusted. Appropriate criteria are used to provide digital certificates to entities interacting with the CBDC blockchain. The entities are only allowed to interact with the CBDC blockchain using the digital certificates so that the interaction with the CBDC blockchain is controlled, even though the interaction with it is in a distributed computing environment. Further, the speed of transactions for end users is not impacted, even though the CBDC blockchain is used. Transactions can be conducted by end users can be conducted in real time, and the settlement of CBDC transactions can occur in non-real time using the CBDC blockchain using embodiments.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    determining, by a delegated certificate authority computer, a tier from a plurality of tiers for a digital wallet provider based on a list of qualifying criteria;
    generating, by the delegated certificate authority computer, a digital certificate based on the tier, wherein the digital certificate includes a first digital signature from a central bank computer and grants access to a digital currency maintained by a blockchain network, wherein the tier requires a digital wallet application computer associated with the digital wallet provider to communicate with the delegated certificate authority computer without directly interacting with the blockchain network;
    signing, by the delegated certificate authority computer, the digital certificate with a second digital signature;
    transmitting, by the delegated certificate authority computer to the blockchain network, a request to obtain a digital wallet provider identifier for the digital wallet provider;
    receiving, by the delegated certificate authority computer from the blockchain network, the digital wallet provider identifier;
    transmitting, by the delegated certificate authority computer to the digital wallet application computer, the digital certificate and the digital wallet provider identifier;
    based on the tier requiring the digital wallet application computer to communicate with the delegated certificate authority computer without directly interacting with the blockchain network:
        receiving, by the delegated certificate authority computer from the digital wallet application computer, a request to add an amount of the digital currency to a digital wallet provider account of the digital wallet provider, the request comprising an amount of the digital currency, the digital wallet provider identifier, and the digital certificate; and
        transmitting, by the delegated certificate authority computer to the blockchain network, the request, wherein the blockchain network verifies the first digital signature and the second digital signature of the digital certificate, and adds to a blockchain maintained by the blockchain network, the amount of the digital currency to the digital wallet provider account.

2. The method of claim 1, wherein the digital wallet application computer provides the digital certificate to the blockchain network in a transaction, which verifies the digital certificate before allowing the transaction to proceed with the blockchain network.

3. The method of claim 1, wherein the digital wallet application computer provides the digital certificate to the delegated certificate authority computer, and the delegated certificate authority computer transmits a transaction request for a transaction to the blockchain network on behalf of the digital wallet application computer, and wherein the blockchain network verifies the first digital signature and the second digital signature of the digital certificate to complete the transaction.

4. The method of claim 1, wherein the list of qualifying criteria is received by the delegated certificate authority computer from a central bank computer and the list of qualifying criteria comprises a plurality of tiers of digital certificates and criteria necessary to be assigned to one of the plurality of tiers.

5. The method of claim 1, wherein the delegated certificate authority computer evaluates the digital wallet provider in response to receiving an onboarding request message.

6. The method of claim 1, wherein the digital certificate comprises an expiration time for which the digital certificate is valid.

7. The method of claim 1, wherein the digital wallet provider identifier is a public key of a public-private key pair.

8. The method of claim 1, wherein the blockchain network maintains a blockchain managing transactions using the digital currency.

9. The method of claim 8, wherein the digital currency is central bank digital currency (CBDC).

10. The method of claim 9, wherein the blockchain network comprises a plurality of nodes.

11. The method of claim 1, further comprising:
transmitting, by the delegated certificate authority computer to the blockchain network, a request to obtain a digital wallet provider identifier for the digital wallet provider;
receiving, by the delegated certificate authority computer from the blockchain network, the digital wallet provider identifier; and
transmitting, by the delegated certificate authority computer to the digital wallet application computer, the digital wallet provider identifier, wherein the digital wallet provider identifier is a digital wallet provider public key of a digital wallet provider public-private key pair.

12. A delegated certificate authority computer comprising:
a processor; and
a non-transitory computer readable medium comprising instructions executable by the processor to perform operations including:
determining a tier from a plurality of tiers for a digital wallet provider based on a list of qualifying criteria;
generating a digital certificate based on the tier, wherein the digital certificate includes a first digital signature from a central bank computer and grants access to a digital currency maintained by a blockchain network, wherein the tier requires a digital wallet application computer associated with the digital wallet provider to communicate with the delegated certificate authority computer without directly interacting with the blockchain network; and
signing the digital certificate with a second digital signature;
transmitting, to the blockchain network, a request to obtain a digital wallet provider identifier for the digital wallet provider;
receiving, from the blockchain network, the digital wallet provider identifier;
transmitting, to the digital wallet application computer, the digital certificate and the digital wallet provider identifier;
based on the tier requiring the digital wallet application computer to communicate with the delegated certificate authority computer without directly interacting with the blockchain network:
receiving, from the digital wallet application computer, a request to add an amount of the digital currency to a digital wallet provider account of the digital wallet provider, the request comprising an amount of the digital currency, the digital wallet provider identifier, and the digital certificate; and
transmitting, to the blockchain network, the request, wherein the blockchain network verifies the first digital signature and the second digital signature of the digital certificate, and adds to a blockchain maintained by the blockchain network, the amount of the digital currency to the digital wallet provider account.

13. The delegated certificate authority computer of claim 12, wherein the digital currency is central bank digital currency (CBDC).

* * * * *